3,068,104
PREPARATION OF SAUSAGE

Albert C. Gretler, Downers Grove, Joseph C. Wilcox, Park Forest, and Ervin W. Hopkins, Hinsdale, Ill., assignors, by mesne assignments, to Armour and Company, Chicago, Ill., a corporation of Delaware
No Drawing. Filed Nov. 10, 1959, Ser. No. 851,947
9 Claims. (Cl. 99—109)

This invention relates to the preparation of casingless sausage. More particularly this invention relates to a method of imparting resilient and self-sustaining properties to the surface of meat products produced in an automatic and continuous process wherein a unit mass of a comminuted meat mixture is subjected to rapid internal heating by means of passing an electric current therethrough.

Conventional methods of making skinless sausages, particularly those of the frankfurter type, have involved placing a comminuted meat mixture into artificial casings after which the encased meat mixture is cooked, generally by heated air. Following cooking, the artificial casing is removed by mechanical means resulting in a final product having an outer layer that simulates the appearance of an encased product.

Other methods have attempted to eliminate the costs incurred in connection with methods using artificial casings by using molds. The molds, which are usually made of metal, are filled with a sausage mixture and then submerged in a hot water bath where cooking occurs. A thin crust is thus formed on the areas of the sausage in contact with the mold wall which has the appearance of a membrane. A significant disadvantage in this method resides in the fact that as cooking takes place in the mold the crust adheres to the walls of the mold. Upon expulsion from the mold the adhering crust of the sausage is broken resulting in a rough, uneven and unattractive surface.

The meat industry has recognized that conventional methods of producing skinless sausages are slow and costly. This has led to the development of methods for producing rapidly cooked skinless sausage products. To achieve this end electrical heating has been used. In one method utilizing an electrical current as a source of heat, a procedure very much like that used in conventional artificial casing methods is employed. The sausage mixture is placed in a casing, electrically heated to coagulate the meat proteins and then directed to a plow or knife which slits the casing and frees the cooked sausage. Although this is a faster method than the conventional method, it requires, in addition to the highly specialized electrical heating apparatus, substantially similar casing removal equipment and the same costly casing material.

In still another method employing electrical heating, the sausage mixture is placed in a mold and heated by electrical current to a temperature insufficient to cook the meat. Following expulsion from the mold, the uncooked sausage is subjected to a cooking operation which takes substantially as long a period of time as is required in conventional methods. It is during this final cooking step that a membrane is formed on the sausage. However, due to the fact that an uncooked sausage is being treated at this point in the operation, the surface of the uncooked sausage is susceptible to damage which often results in a final product having a non-uniform and broken outer crust.

We have discovered a method of imparting resilient properties to the surface of skinless sausage products which not only materially reduces the time, amount of equipment and costs involved with methods heretofore used, but yields a product having a uniformly smooth, even and attractive appearance.

Accordingly, an object of this invention is to provide a method of manufacturing skinless sausages and the like utilizing rapid internal heating such as is accomplished by the passage of an electric current through the sausage mixture which yields casingless sausage having smooth, tender yet firm, and attractive surface characteristics that represent a substantial improvement over conventional skinless sausage products while eliminating the inherent disadvantages encountered in conventional skinless sausage manufacturing methods.

We have for a further object the provision of a method of manufacturing skinless sausages and the like utilizing rapid internal heating procedures which substantially reduces the time, amount of equipment and costs incurred in imparting resilient surface characteristics to casingless sausage products.

Further objects of the invention will appear from the more detailed description of this invention hereinafter set forth.

A satisfactory method which embodies our invention involves extruding a properly prepared meat mixture into a chamber or mold, subjecting the unit mass of meat mixture to rapid internal heating by passing an electrical current through the mixture to coagulate the proteins and to cook the meat mixture while preventing dehydration of the surface of the unit mass, ejecting the cooked meat mixture from the chamber or mold without disturbing the surface characteristics of the mixture, and subjecting the thus cooked unit mass of meat mixture to a current of heated air while the unit mass is being rotated whereby the surface of the unit mass of sausage mixture is dehydrated to form a thin, integral crust or coating having resilient properties.

By the phrase "internal heating" we mean the substantially simultaneous heating by electrical resistance of the whole of a unit mass of a sausage meat mixture to a temperature sufficient to coagulate meat proteins and to cook the meat.

The meat mixture employed in connection with the method of this invention preferably is prepared in accordance with the method described in our co-pending application Serial No. 846,795, filed October 16, 1959. The method of that application involves placing a suitable meat mixture into a standard meat grinder to comminute it. Ice and the necessary salts and cure may then be added and the comminuted sausage mixture subjected to further mixing and blending. A chilling operation follows after which, in the preferred practice, the chilled comminuted meat mixture is mechanically mixed under vacuum. The meat mixture is then tempered and made ready for extrusion into a mold.

This conditioning procedure is particularly suitable for rapid internal heating procedures wherein an electrical current is passed through the sausage mixture to coagulate proteins and to cook the meat. The conditioning operation briefly outlined above in some way affects the physical and chemical properties of the meat. The explanation of the manner in which these changes are brought about by this method of treating the meat is not clear but it has been observed that it does have a pronounced effect on the finally cooked product.

In accordance with the preferred practice of this invention a unit mass of the meat mixture conditioned in the manner described is extruded into a chamber or mold. Sufficient pressure is applied during the extrusion operation to render the mixture substantially free of voids. If air pockets are present cooking will not be uniform and an unacceptable product will result. The extrusion process is continued until the limits of the mold cavity corresponds to the desired shape, size and weight of the sausage being manufactured. In the case of frankfurters, the mold is of a cylindrical shape.

The mold is preferably made of a material which presents a smooth, substantially water and air impervious surface to the compacted sausage mixture. Since electrical resistance heating methods are employed in this invention it is preferred that the mold be made of some suitable non-conductive material. It has been found that one of the most desirable molds for achieving the purposes of this invention are made of Alite, a complex aluminum oxide composition, or a related material, Mica Lex. The latter substance is principally comprised of aluminum oxide but contains mica to alter its heat conducting capacity. Other ceramic-like materials, in addition to glass, Teflon and nylon, may also be used.

For reasons not satisfactorily explainable by us, we have found that the development of desired surface characteristics in the cooked sausage mixture is achieved when the temperature of the mold is in a range not substantially different from that of the sausage mixture placed therein. This temperature range is from about 30° F. to about 60° F. and may be controlled by spraying cooled water into the mold cavity prior to extruding the sausage mixture into it. A water jacket on the mold or other suitable temperature regulating means may also be employed for this purpose.

Compatibility between the temperature of the sausage mixture and the mold, in addition to having a desirable effect on the surface characteristics of the cooked product, also serves to maintain the conditioned sausage mixture in a state ready for cooking and aids in the development of proper texture and color properties in the cooked product.

In the preferred practice of this invention the mold is employed in connection with apparatus which is capable of rapid internal cooking of the sausage mixture. Rapid internal cooking may be accomplished by holding the comminuted sausage mixture in the mold and bringing electrodes into contact with each end of the mixture thus making the mixture part of an electric circuit. An electric current may then be passed through the mixture which represents a moderate electrical resistance in the circuit. The flow of current through this resistance results in the generation of internal heat sufficient to cook the unit mass of mixture. It is desirable that the electrical cooking means employed be associated with an integrator the function of which is to assure that a fixed amount of electrical energy will be passed through each unit mass of mixture regardless of any variation in the electrical resistivity of the mixture.

The cooking time generally is about one-third of a second, but this interval may vary depending on the temperature of the mixture at the time of current flow, the size of the unit mass of sausage mixture, the salt content thereof, and the amount of electrical energy passed through the unit mass.

The temperature at which the meat mixture is cooked has a substantial effect on the surface properties of the final product. A cooking temperature that is too high will cause a separation of the fat particles from the meat mixture resulting in a condition known as "rendering." If this occurs the surface of the cooked sausage becomes pitted and excessively greasy making further processing of the sausage commercially unfeasible. A cooking temperature that is too low, on the other hand, will result in a final product having an outer layer of uncoagulated meat proteins, poor overall texture and color characteristics.

We have found that an electrically generated temperature of from about 150° F. to about 180° F. and preferably from about 155° F. to about 170° F. produces a final product not only having the desired surface properties but also a texture and color comparable to high quality sausages produced by the slower conventional methods.

Since cooking takes place in a mold that is substantially moisture and air impervious, the surface of the sausage, although cooked, remains in a moistened condition. By thus preventing dehydration of the surface of the cooked sausage, at no point does the surface adhere to the mold cavity wall. In this state the surface of the cooked sausage is self-lubricating and thus may be easily ejected from the mold. Ejection may be accomplished by hand or by suitable mechanical means such as, for example, a plunger.

Following removal from the mold, the cooked sausage, in accordance with the preferred practice of this invention, is subjected to a current of heated air. Air heaters equipped with fans may be employed for this purpose. The temperature of the heated air may vary from about 120° F. to about 250° F. with a temperature range of from about 155° F. to about 175° F. being preferred. The heated air dehydrates the surface of the cooked sausage mixture forming a crust or membrane thereon which is integral with the remainder of the sausage mixture. This crust has sufficient resiliency to retain the juices in the sausage mixture and to enable the cooked sausage to be handled, without further surface hardening treatment, in such post-forming operations as smoking, dyeing, if necessary, refrigeration and packaging.

To insure uniform and equal dehydration of the outer layer of the cooked sausage we have found it highly advantageous to rotate the sausage while the current of heated air is performing its function. Rotation of the sausage may be accomplished by rolling the sausage down an inclined surface or, preferably, by placing the cooked sausage on a conveyor belt composed of a series of independently and uniformly rotating rollers. The inclined surface or the rollers may be heated to dehydrate the outer layer of the cooked sausage. Although this invention contemplates the use of such means in lieu of heated air to form a "skin" on the cooked sausage, the use of heated air is preferred.

The length of time that it takes to dehydrate the surface of the cooked sausage mixture and form the desired crust or membrane thereon varies from about 3 minutes to about 20 minutes, with from about 8 minutes to about 10 minutes generally being all that is required. The time period necessary is, of course, dependent upon the speed at which the cooked sausage is rotated, its linear speed, and the temperature of the heated air.

If desired, the cooked sausage mixture may be subjected to a smoking operation concomitantly with the "skin" or membrane forming operation. This may be achieved by connecting the heated air ducts to a conventional smoke generating apparatus. Employing smoke at this point in the procedure has the effect of imparting desirable taste, color and bacteriostatic properties to the cooked sausage. It is also believed that certain chemicals carried by the smoke have an added effect upon the formation of the crust on the cooked sausage.

The crust, "skin," or membrane formed on the surface of the cooked sausage mixture in accordance with the practice of this invention has a smooth and wrinkle free appearance. The crust, in addition, is of sufficient density to be able to hold the meat juices in the body of cooked sausage, and has enough resiliency to prevent easy breaking. Moreover, it has a blend of tenderness and firmness which makes it pleasing to the bite and chew of an individual eating it and, being composed of the same cooked meat as the remainder of the sausage, it is readily digestible.

In accordance with the teachings of this invention the term "sausage" is intended to mean all products comprising ground meat, such as beef, ham, veal, pork products and in particular such items as frankfurters, bologna, luncheon loaf, and other well-known cooked sausage products.

The foregoing detailed description has been given for purposes of explanation only and it is expected that changes may be made in the details of procedures without departing from the spirit of this invention.

We claim:

1. A method of imparting resilient properties to the surface of meat products produced in a process wherein a unit mass of a comminuted meat mixture is subjected to rapid internal heating by electric current in a mold to coagulate the proteins and to cook the meat mixture therein, comprising the steps of substantially preventing the dehydration of the surface of said unit mass by confining said unit mass in a moisture and air impervious mold while said unit mass is being internally heated, removing said unit mass from said mold, and subjecting said unit mass while rotating it in a current of heated air to dehydrate the surface thereof.

2. A method of imparting resilient properties to the surface of meat products produced in a process wherein a unit mass of a comminuted meat mixture is subjected to rapid internal heating by electric current in a mold to coagulate the proteins and to cook the meat mixture therein, comprising the steps of substantially preventing the dehydration of the surface of said unit mass by confining said unit mass in a moisture and air impervious mold while said unit mass is being internally heated at a temperature of from about 150° F. to about 170° F., removing said unit mass from said mold, and subjecting said unit mass while rotating it to a current of heated air at a temperature of from about 120° F. to about 250° F. to dehydrate the surface thereof.

3. A method of imparting resilient properties to the surface of meat products produced in a process wherein a unit mass of a comminuted meat mixture is internally heated electrically in a mold to coagulate meat proteins and to cook the meat mixture therein, comprising the steps of substantially preventing the dehydration of the surface of said unit mass by confining said unit mass in a moisture and air impervious mold while said unit mass is being internally heated electrically, removing said unit mass from said mold, and subjecting said unit mass while rotating it to a current of heated air and smoke to dehydrate the surface thereof and impart flavor and color to the cooked meat mixture.

4. A method of imparting resilient properties to the surface of meat products produced in a process wherein a unit mass of a comminuted meat mixture is subjected to an electric current to internally heat and cook the meat mixture, comprising the steps of substantially preventing the dehydration of the surface of said unit mass by confining said unit mass in a moisture and air impervious mold while said unit mass is being internally heated at a temperature of from about 155° F. to about 170° F., ejecting said unit mass from said mold, and subjecting said unit mass while rotating it at a uniform rate to a current of heated air at a temperature of from about 155° F. to about 175° F. for a period of from about 3 minutes to about 20 minutes to dehydrate the surface thereof.

5. A method of forming a membrane on a skinless cooked sausage product produced in a process wherein a unit mass of a comminuted meat mixture is subjected to an electric current to internally heat and cook said unit mass, comprising the steps of extruding a unit mass of said meat mixture into a substantially moisture and air impervious mold to prevent dehydration of the surface of said unit mass while said unit mass is being internally heated, removing said unit mass from said mold, and subjecting said unit mass while rotating it to a current of heated air to dehydrate the surface thereof.

6. A method of forming a crust on a skinless cooked sausage product produced in a process wherein a unit mass of a comminuted meat mixture is subjected to an electric current to internally heat and cook said unit mass, comprising the steps of extruding a unit mass of said meat mixture into a cooled, substantially moisture and air impervious mold to prevent dehydration of the surface of said unit mass while said unit mass is being internally heated and cooked, ejecting said unit mass from said mold and subjecting said unit mass while rotating it to a current of heated air and smoke to dehydrate the surface thereof and to impart flavor and color thereto.

7. A method of preparing sausages of the skinless variety having resilient surface characteristics comprising the steps of passing an electric current through a unit mass of a comminuted meat mixture while said mass is encased in a substantially water impervious mold to heat said mass to a temperature sufficiently high to coagulate proteins and to cook the meat mixture therein but not higher than about 180° F. at the surface of said mass whereby a self-sustaining structure is imparted to the mass while retaining its surface moisture, removing said mass from the mold, and directing against the surface of said unit mass while rotating it in a current of air having a temperature in excess of about 120° F. to remove surface moisture and impart resilient surface characteristics thereto.

8. A method of preparing sausage of the skinless variety having resilient surface characteristics comprising the steps of passing an electric current through a unit mass of a comminuted meat mixture while said mass is encased in a substantially water impervious mold to heat said mass to a temperature sufficiently high to coagulate proteins and to cook the meat mixture therein but not higher than about 180° F. at the surfaces of said mass whereby a self-sustaining structure is imparted to the mass while retaining its surface moisture, removing said mass from the mold, and directing against the surface of said unit mass while rotating it a current of smoke ladened air having a temperature in excess of about 120° F. to remove surface moisture and impart resilient surface characteristics thereto.

9. A method of preparing sausage of the skinless variety having resilient surface characteristics comprising the steps of passing an electric current through a unit mass of a comminuted meat mixture while said mass is confined in a substantially water impervious mold to heat said mass to a temperature sufficiently high to coagulate proteins and to cook the meat mixture therein whereby a self-sustaining structure is imparted to the mass while retaining its surface moisture, removing said mass from the mold, and rotating said mass on a heated surface to remove moisture from the surface of said mass and impart resilient properties thereto.

References Cited in the file of this patent

UNITED STATES PATENTS

| | | |
|---|---|---|
| 2,685,518 | Prohaska | Aug. 3, 1954 |
| 2,877,118 | Hensgen et al. | Mar. 10, 1959 |